US006248854B1

(12) United States Patent
Höhn et al.

(10) Patent No.: US 6,248,854 B1
(45) Date of Patent: Jun. 19, 2001

(54) MODIFIED EPOXYSILOXANE CONDENSATE, PROCESS FOR PRODUCING THE SAME AND ITS USE AS LOW-STRESS CASTING RESINS IN THE ELECTRONIC AND ELECTROTECHNICAL INDUSTRY

(75) Inventors: Klaus Höhn, Taufkirchen; Ernst Wipfelder, München, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/230,505

(22) PCT Filed: Jun. 23, 1997

(86) PCT No.: PCT/DE97/01303

§ 371 Date: Jan. 26, 1999

§ 102(e) Date: Jan. 26, 1999

(87) PCT Pub. No.: WO98/04609

PCT Pub. Date: Feb. 5, 1998

(30) Foreign Application Priority Data

Jul. 26, 1996 (DE) .............................. 196 30 319

(51) Int. Cl.[7] ................................................. C08G 77/06
(52) U.S. Cl. .................... 528/25; 528/33; 528/34; 528/43; 528/421; 528/29; 549/512; 549/555; 549/215; 556/458; 556/457; 556/450; 556/459; 525/476; 525/533

(58) Field of Search ...................... 525/476, 533; 528/25, 33, 29, 34, 43, 421; 549/512, 555, 215; 556/458, 457, 450

(56) References Cited

U.S. PATENT DOCUMENTS

| 4,851,481 | * | 7/1989 | Kuriyama et al. . |
| 5,280,098 | | 1/1994 | Witucki et al. . |

FOREIGN PATENT DOCUMENTS

| 0 468 239 A2 | 7/1990 | (EP) . |
| 0 641 826 A1 | 8/1993 | (EP) . |
| WO 95/06050 | 8/1993 | (WO) . |

* cited by examiner

Primary Examiner—Robert Dawson
Assistant Examiner—Kuo-Liang Peng
(74) Attorney, Agent, or Firm—Schiff Hardin & Waite

(57) ABSTRACT

An epoxysiloxane condensate is modified by means of an in situ reaction with an organic compound, which is di-functional or multifunctional if warranted. By means of the disclosed method, the characteristics of epoxysiloxane condensates, epoxy resin mixtures, epoxy resin formulations and molded bodies manufactured therefrom can be varied easily and economically.

29 Claims, No Drawings

MODIFIED EPOXYSILOXANE CONDENSATE, PROCESS FOR PRODUCING THE SAME AND ITS USE AS LOW-STRESS CASTING RESINS IN THE ELECTRONIC AND ELECTROTECHNICAL INDUSTRY

FIELD OF THE INVENTION

The invention relates to an epoxysiloxane condensate modified by means of an in situ reaction with an organic compound, preferably a di-functional or multi-functional compound.

BACKGROUND OF THE INVENTION

From German Patent document number 43 28 465, a method is known for manufacturing epoxysiloxane condensates in which epoxysiloxanes are obtained by condensation of epoxy-functional alkoxysiloxanes with silanoles. These epoxysiloxane condensates can be used either directly as casting resins or for mixing with epoxy resins for electronics applications. The casting resin systems with epoxy-containing siloxanes are also suitable for the manufacture of temperature-stable and thermomechanically loadable molding materials. The epoxysiloxane condensates have a general structure that can be derived from the epoxyalkoxysilanes used and the silanoles used and chemical analyses. In order further to adapt the epoxysiloxane condensates to the specific areas of use, it is desirable to be able to vary the electronic and steric ratios and also the polarity of the resins within wide limits. By means of the chemical modification of the condensates, custom-tailored casting resins are made available that can be adapted in a particularly flexible fashion to the technical requirements in processing and later operation.

SUMMARY OF THE INVENTION

It is thus an object of the present invention to provide a method for modifying epoxysiloxane condensates as well as modified epoxysiloxane condensates in which the chemical-functional structure of the products can be adjusted within wide limits.

The general recognition of the invention is that in alkoxysilanol condensation the ratio of reactive silanol groups to the alkoxy groups of the epoxy-functional siloxanes can be adjusted in wide limits in such a way that not all alkoxy groups are consumed by silanoles. These alkoxy groups still free after the reaction with the silanoles can be converted in a further condensation step with organic compounds that are as multifunctional as possible. By means of the construction of different organic compounds, the physico-chemical characteristics of the casting resins can be purposively influenced. The possibly contained further functionalities of the organic compounds (also called modifiers) serve as additional points of connection of the obtained siloxane casting resins in the epoxy resin cross-linkages. The epoxysiloxanes can thereby be built into the epoxy resin cross-linkage even more effectively.

The subject matter of the invention is a modified epoxysiloxane condensate that can be obtained by means of the following condensation steps:

a) Condensation of an epoxyalkoxysilane of the general structure 1 with a silanol of the general structure 2

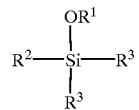

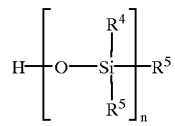

whereby
$R^1$ stands for an alkyl residue with 1 to 22 C atoms or an aryl residue,
$R^2$ is a glycidyloxyalkyl residue, epoxyalkyl residue or an epoxycycloalkyl residue, the two residues
$R^3$ stand for $OR^1$ or $R^{2,}$ independently of one another, or for a further alkyl or aryl residue,
$R^4$ means alkyl- or aryl-, the residues
$R^5$ stand for OH or $R^4$, independently of one another, and
n is a whole number greater than 1 and b) condensation of the alkoxy-group-containing epoxysiloxane condensate obtained in this way with a stoichiometric quantity of an organic compound with a linear, branched or cyclical, aromatic if warranted, carbon structure of 1 to 24 C atoms and at least one condensable functional group.

In addition, the subject matter of the present invention is a method for modifying epoxysiloxanes in which, in a first condensation step, a) an epoxysiloxane 1 is condensed with a silanol 2, whereby 1 and 2 are the compounds indicated above, and after reaction of the silanol 2, in a further condensation step, b) the alkoxy-group-containing epoxysiloxane condensate so obtained is condensed in situ with an organic compound with a linear, branched, or cyclical, and aromatic if warranted, carbon structure of 1 to 24 C atoms.

Finally, the subject matter of the present invention also includes the application of the inventively modified epoxysiloxane condensate for mixing with standard epoxy resins. The time at which the mixing with the epoxy resin takes place can thereby be selected arbitrarily during, before and after the reaction sequence a) condensation of 1 with 2, then b) condensation of the obtained alkoxy-group-containing epoxysiloxane condensate with an organic compound, di-functional or multifunctional if warranted.

Other objects and advantages of the present invention will become apparent from reading the following detailed description and appended claims, and upon reference to the accompanying drawings.

DETAILED DESCRIPTION OF THE PRESENTLY PREFERRED EMBODIMENTS

The inventive method can be carried out in a short time in a simple batch reaction under normal conditions with respect to atmosphere and pressure, and thus with a minimal process outlay. As a first product, a mixture of various siloxanes is obtained that are the condensate of the epoxyalkoxysilane 1 with the silanol 2. In this first condensation reaction, an Si-O-Si bond is made from the alkoxy group of the epoxysilane and the OH group of the silanol, with splitting off of the corresponding alkyl alcohol. The compound containing this Si-O-Si bond is called epoxysiloxane condensate. Since due to the stoichiometry not all available alkoxy groups from 1 are consumed in the first condensation step, these serve as reaction centers for the second condensation step.

According to the invention, the second reaction step is brought to reaction in situ in the one-pot reaction from 1 and 2 with a condensable, di- or multi-functional if warranted, organic compound with a linear, branched, or cyclical, and aromatic if warranted, carbon structure of 1 to 24 C atoms, and, as functional groups, hydroxy functions, epoxy functions, ester functions, lactone functions, lactam functions, halogen functions and/or pseudo halide and/or unsaturated C—C bonds, as well as spiro groups and/or bicycloorthoester groups and/or spirocarbonate groups. Preferably, this second method step is first carried out when the silanol that was used for the first method step is consumed as completely as possible. For this purpose, it can be advantageous to use a deficiency of silanol for the first condensation step.

The epoxyalkoxysilane 1 used as an initial compound bears 1 to 3 condensable alkoxy groups ($OR^1$ and $R^3$). The residue $R^1$ is arbitrary, but is preferably an alkyl residue with 1 to 8 C atoms, since the reactivity of the group to be split off in the condensation decreases as the chain length of the alkyl residue increases. The most reactive initial compounds are thus the epoxymethoxysilanes. Due to the toxicological harmlessness of the split-off ethyl alcohol, ethyl can also be preferred as an alkyl group. Since the alcohols or low-molecular fission products released in the condensation are preferably taken from the reaction mixture, the shorter-chained alkyl residues are preferred, in which the alcohols or fission products resulting therefrom have a relatively lower boiling point, and can thus be separated more easily.

Due to the simpler availability, monomer epoxyalkoxysilanes 1 are preferred, but in principle the reaction is also possible with correspondingly longer-chained, higher-molecular alkoxysiloxanes.

Correspondingly longer-chained silanoles 2, which comprise OH groups as reactive groups in the α position, α and ω position, or in the chain, are more easily available. The selection of the further organic group $R^4$, bound via SiC, is uncritical; it can be an arbitrary alkyl residue or aryl residue.

The index "n," which determines the number of siloxane units in the silanol 2, can represent any number greater than 1, preferably between 1 and 100. As n increases, for reasons of incompatibility no homogenous reactions can be carried out, and the reaction speed decreases significantly even at increased temperatures, so that n is advantageously selected between 1 and 12. However, dependent on the remaining residues, an increasing incompatibility of the condensation products in relation to epoxy resins can also result, even with increasing chain length, which incompatibility can render difficult or impossible a desired later use of these condensation products as resin components in mixture with precisely these epoxy resins.

The epoxy-containing or glycidyloxyalkyl-group-containing residue $R^2$ of the initial compound 1 is bound to silicon via a C atom and is otherwise freely selectable. According to the availability of the corresponding epoxyalkoxysilane, $R^2$ can be a glycidyloxyalkyl group, an epoxyalkyl group, a glycidyloxyaryl group, an epoxyaryl group, or an epoxycycloalkyl group. The corresponding glycidyloxy compounds, obtained by condensation of correspondingly reactive compounds with epichlorhydrine, are easily available.

According to the reactivity of the initial materials, which can be prevented electronically and sterically, for the support of the condensation a condensation catalyst can be required. With respect to the condensation itself, no limitations result for the catalyst, so that an arbitrary condensation catalyst is suitable. However, taking into account the preferred or intended use of the product as a resin component for reaction resins, the catalyst is chosen such that the epoxy group is retained as far as possible in the condensation. A catalyst that is ideal in this respect thus reacts neither in pronouncedly basic nor in pronouncedly acidic fashion; in the ideal case it is neutral.

For the second condensation, following the first condensation, the organic compound, di-functional or multi-functional if warranted, is added in a stoichiometric amount in relation to the still-present alkoxy functions. After a short time, the liberation of an alkoxy alcohol formed, volatile as a rule, can be observed; in the case of a methoxy compound this is for example of methanol.

The condensation of the initial materials with the epoxysiloxane condensate can take place as a solution in suitable solvents, e.g. in hydrocarbons and/or in aromatic hydrocarbons such as ethers or the like. However, for thinning the epoxy resins provided for mixing can also be used. It is also possible to carry out the condensation without solvents, as a bulk reaction. In order to obtain exclusively clear and transparent products, the condensation is catalyzed and carried out as a bulk reaction.

The condensation can take place in an open reaction vessel, and is carried out with a temperature increase. Preferred condensation temperatures are between 80 and 150° C. Volatile reaction products are thereby preferably driven out, for example with injection or transfer of an inert gas (e.g. nitrogen). By this means, the durability and stability of the product itself or, respectively, of its mixture with reaction resins is increased.

The composition of the modified epoxysiloxane condensate that can be obtained by means of the method is dependent at first on the reaction conditions and on the stoichiometry of the preparations. For alkoxy-silanol condensation, the silanol functions are added in deficient quantities, so that it is ensured that after the first condensation step free alkoxy functions are available for the second condensation step. The deficiency is thereby to be dimensioned in such a way that at least one alkoxyl function of the epoxysilane 1 is consumed in the condensation step.

As is known from the prior art, the condensation product formed in the first stage is a colorless transparent oil. The addition of the organic compound, di-functional or multi-functional if warranted, now takes place stoichiometrically, i.e. exactly one condensable function of the organic compound is reckoned per still-existing alkoxy function in the epoxysiloxane condensate. There then takes place a transesterification, so that the organic compound is bound to the epoxysiloxane condensate via the oxygen, and, if warranted, is provided with a further free functional group.

An excess of organic compound can be removed after the reaction has taken place in heat in the vacuum. Further functional groups are not brought to reaction at first in the manufacturing of the resin. The inventive modified epoxysiloxane condensate accordingly comprises further functional groups, and can be designated "higher-functional." In the mixing of the product with further standard reaction resins, the still-free functional groups serve chiefly to achieve a more intensive chemical fixing of the condensate in the epoxy resin network during the cross-linkage, and to influence later material characteristics in a purposive manner. These functional groups can serve so to speak as "anchors" of the modified siloxane condensate in the epoxy resin, and improve the "low-stress" behavior of corresponding molding materials or molded bodies. By means of siloxane condensates "anchored" in the epoxy resin in this way, there arise epoxy resin molding materials that exhibit a lower evaporation characteristic and lower water absorption in relation to the previously known materials with the conventional epoxysiloxane condensates. Preferably, the inventive mixtures of the condensates and epoxy resins are used for the formation of corresponding epoxy resin molding materials or molded bodies. The set of characteristics named above can thus be lent to these molding materials, and in this way molding materials molding materials with low-stress characteristics can be formed. The cross-linkage reaction of the formulations of the mixture and a hardener takes place according to the standard methods of epoxy resin chemistry.

In principle, the preferably described epoxysiloxane condensates can be mixed with practically any standard reaction resin or epoxy resin in almost any mixture ratio.

Correspondingly, new reaction resin mixtures can be obtained with aliphatic and aromatic glycidyl ethers, in particular based on bisphenol-A and -F, with corresponding glycidyl esters, aliphatic and cycloaliphatic epoxies, or arbitrary other epoxies, e.g. those obtained by epoxidization of unsaturated compounds. By heating the epoxysilanes in an applied vacuum, the storage stability of the reaction resin mixture with the new epoxysiloxane can be further increased.

The structure and the chemical-physical behavior of the obtained epoxy resins can be set within wide limits by the selection of the organic compound, which is di-functional or multifunctional if warranted. Likewise, the phase separation characteristic can be set purposively during the hardening by means of the organic compound, given unmodified siloxane content or unmodified siloxane components. The morphology, the modulus of elasticity, the thermal expansion coefficient a and the mechanical relaxation behavior of the molding materials or molded bodies obtained at the end of the manufacturing chain can thus be influenced.

The morphology determines the mechanical behavior of a molding material, and is the determining factor for the low-stress characteristics of a material. Morphology is here understood to refer to the microstructure, formed during the hardening, of an epoxy resin matrix and embedded chemically fixed siloxane-rich domains. Besides finely distributed siloxane domains, the siloxanes can be deposited as a second phase, whereby multi-phase opaque molding materials are present.

The previously known epoxysiloxanes of the prior art, in particular those disclosed in P 43 28 465.5, which corresponds to U.S. Pat. No. 5,492,981, are designated as "epoxysiloxane condensate" or "epoxysiloxanes," whereby an alkyl alcohol is released in the condensation reaction. The disclosure content of the above-named patent U.S. Pat. No. 5,492,981 is hereby acknowledged and made part of the subject matter of the present specification.

The product that can be obtained by the two method steps, namely, first, condensation of the epoxyalkoxysilanes (=alkoxy bonding) with the silanol, and subsequent condensation of the remaining alkoxy function on the epoxysiloxane condensate with the freely selectable organic compound, di-functional or multifunctional if warranted, is hereby designated as "transesterification product" or "modified epoxysiloxane condensate."

"Condensable" and/or "di- or multifunctional" compounds are used as the organic compound with which the condensation is carried out in the second method step b). "Condensable" thereby means that the compound has a hydroxy group or a halogen group for condensation or transesterification with alkoxy groups.

"Di- or multi-functional" means here that in addition to these hydroxy or halogen functions with which the modified epoxysiloxane condensate is formed, the organic compounds also have further reactive groups, such as for example hydroxy functions, epoxy functions, ester functions, lactone functions, lactam functions, halogen and/or pseudohalogen functions, and/or unsaturated C—C bonds, as well as spiro groups and/or bicycloorthoester and/or spirocarbonate groups for the further functionalization of the condensation product that arises.

"Condensation" here designates any reaction in which the alcohol on which the "alkoxy" is based, or another low-molecular fission product, such as for example R—X (with X=halogen and R=alkyl residue of the alkoxy group), can be released from an alkoxy group.

In a standard epoxy resin formulation—consisting of epoxy resin, hardener, catalyst, various additive materials and an epoxysiloxane condensate—the modified siloxane condensate described here is chemically built into the epoxy resin network via additionally introduced functionalities. The siloxane is thereby fixed still more firmly into the duromer matrix, and the hydrolysis behavior, the water absorption, the thermal behavior and the evaporation behavior of the molding materials is improved. Via the additionally inserted organic intermediate elements, the mechanical behavior (modulus of elasticity, glass transition temperature) can be matched advantageously to the technical requirements with respect to the low-stress problematic.

The obtained epoxysiloxane molding materials are provided with increased bond fastness to carrier substances, such as for example V2A steel.

In the following, the invention is explained in more detail on the basis of some embodiments.

For the alkoxysilanol condensation, for reasons of simplicity model reactions with A-187 (3-glycidyloxypropyltrimethoxysilane, Hüls) and diphenylsilane diol (ABCR GmbH & Co.) were carried out in a molar ratio of 1:1 in relation to the alkoxy and silanol groups. As diol compounds, 1,4-butane diol (Merck), 1,6-hexane diol (Merck), 1,4-bis(dimethanol)-cyclohexane (Merck), TCD alcohol DM (octahydro-4,7-methano-1H-indene-1(2),5(6)-dimethanol, Hoechst), and bis(4-hydroxyphenyl)sulfone (Merck) were used as obtained.

The further processing of the condensates to form a 1:1 casting resin took place with cycloaliphatic CY179(3,4-epoxy-cyclo-hexylmethyl-3',4'-epoxy-cyclo-hexane carboxylate, Ciba-Geigy).

Silane Condensation and Condensation with Heavy Volatile Diol Derivates:

23.6 (0.1 mol) A-187 and 0.1 g IPT (tetra-ortho-isopropyltitanate, Hüls) were mixed portion-by-portion within 10 min with 21.6 g (0.1 mol) diphenylsilane diol at 120° C. With MeOH development, a reaction solution formed in which after 1 h the diol (cf. Table 1) was given, and was maintained at 120° C. for another 2 h. The volatile portions were removed at approx. 50 to 60° C. and 0.5 Torr within 30 min. In the case of 1,4-butane diol, 47.2 g (theory: 44.7 g) of a bright yellow medium-viscosity oil was obtained. The transparent condensate dissolves well in acetone, methylene chloride and toluol. Cyclical $^{Ph}D3/^{Ph}D4$ homoproducts, formed by ring formation from diphenylsilane diol, were not detectable in any of the condensates in the DC experiments or thin film chromatography.

TABLE 1

Diols used, yield and consistency of the condensate

| Diol (MW [g/mol]) | Quantity [g] (mol) | Yield [g] (calculated) | Consistency |
|---|---|---|---|
| without reference | 0 | 38.9 (38.9) | transparent |
| 1,4-butane diol (90.12) | 9.0 (0.1) | 47.2 (44.8) | transparent |
| 1,6-hexane diol (118.18) | 8.8 (0.075) | 44.8 (44.6) | transparent |
| 1,4-bis(dimethanol cyclohexane (144.22) | 10.86 (0.075) | 47.7 (46.6) | transparent |
| TCD alcohol DM (196.29) | 14.7 (0.075) | 53.5 (51.8) | transparent |
| bis(4-hydroxyphenyl) sulfone [1] (250.28) | 12.5 (0.05) | 50.8 (48.9) | opaque, bright yellow |

[1] 0.1 g dibutyl tin dilaurate was used as a condensation catalyst.

Further Processing with CY179:

The siloxane condensates were processed at 120° C. to form a homogenous 1:1 casting resin. For this purpose, the resins were de-gased for 10 min at 0.5 Torr and tempered at 120° C. for 30 min (Table 2).

TABLE 2

Selected characteristic values of the 1:1 casting resin with CY179.

| | HK166 | HK168 | HK157 | HK159 | HK161 | HK163 |
|---|---|---|---|---|---|---|
| Diol | none | 1,4-butane diol | 1,6-hexane diol | 1,4-bis(di-methanol)-cyclohexane | TCD alcohol DM | bis(4-hydro-xy-phenyl) sulfone |
| EEW[1] | 0.482 | 0.467 | 0.470 | 0.456 | 0.447 | 0.407 |
| experim. calculated | 0.493 | 0.477 | 0.457 | 0.472 | 0.461 | 0.468 |
| Viscosity η(80° C.) [mPas] | 60 | 160 | 380 | 190 | 220 | 520 |
| Appearance | water-clear transparent | water-clear transparent | water-clear transparent | water-clear transparent | water-clear transparent | water-clear transparent |

[1]EEW = epoxy value [mol/100 g]

Manufacture of the Molding Material:

30.0 g 1:1 casting resin was melted at approx. 50° C. with 0.95 reaction equivalent HT907 (Hexahydrophthalic acid anhydride, Ciba-Geigy) and 0.3 g 2,4-EMI(2-ethyl-4-methylimide azol, BASF) was de-gased for 30 min at 0.5 Torr and thermally cross-linked: 1 h 80° C., 1 h 120° C. and 2 h 160° C.

The inventive synthesis concept of condensation with subsequent transesterification offers a broad potential for development. In mixture with commercial epoxy casting resins, the physico-chemical characteristics, the morphology and the stress behavior of the molding materials obtained can be varied within wide limits.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A method of manufacturing modified epoxysiloxanes comprising the steps of:
   a) implementation of a condensation of an epoxyalkoxysilane of the general structure 1 with a silanol of the general structure 2

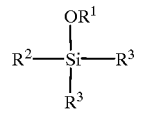

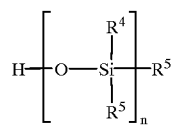

to produce an alkoxy-group-containing epoxysiloxane condensate, whereby $R^1$ is selected from the group consisting of an alkyl with 1 to 22 C atoms and an aryl, $R^2$ is selected from the group consisting of glycidyloxyalkyl, epoxyalkyl and an epoxycycloalkyl, $R^3$ is selected from the group consisting of $OR^1$, $R^2$, an allyl and an aryl, $R^4$ is selected from the group consisting of an alkyl and an aryl, $R^5$ is selected from the group consisting of OHl and $R^4$, and n is a whole number greater than 1; and
   b) carrying out a condensation of the alkoxy-group-containing epoxysiloxane condensate produced in step (a) with a stoichiometric quantity of an organic compound comprising a carbon structure having 1 to 24 C atoms and at least one condensable functional group.

2. The method of claim 1 wherein the organic compound used in step (b) comprises a structure selected from the group consisting of a linear carbon chain, a branched carbon chain, a cyclical structure and an aromatic structure.

3. The method of claim 1 wherein the organic compound used in step b) further comprises a plurality of reactive groups.

4. The method of claim 1 wherein the at least one condensable functional group is selected from the group consisting of hydroxy, epoxy, ester, lactone, lactam, halogen, pseudo halide, unsaturated C—C bonds, spiro groups, bicycloorthoester groups and spirocarbonate groups.

5. The method of claim 1 wherein the condensations of steps (a) and (b) are carried out as a batch reactions.

6. The method of claim 1 wherein the condensations of steps (a) and (b) are carried out at a temperature ranging from about 80° C. to about 150° C.

7. The method of claim 1 wherein the condensation of step (a) is carried out with a stoichiometric deficiency of silanol 2.

8. The method of claim 1 wherein steps (a) and (b) are carried out under an the inert gas stream.

9. The method of claim 1 wherein the cumulative reaction time of steps (a) and (b) ranges from about 2 hours to about 24 hours.

10. The method of claim 1 wherein the cumulative reaction time of steps (a) and (b) ranges from about 6 hours to about 8 hours.

11. The method of claim 1 further comprising the step of (c) subjecting the reaction product of step (b) to a thermal treatment in a vacuum.

12. The method of claim 1 further comprising the following step after step (a) and before step (b):
   mixing alkoxy-group-containing epoxysiloxane condensate produced in step (a) with an epoxy resin.

13. The method of claim 1 further comprising the following step after step(b):
   mixing condensate produced in step (b) with an epoxy resin.

14. The method of claim 1 further comprising the following step after step (b) of fabricating a molded body from the modified epoxysiloxanes.

15. The method of claim 13 further comprising the following step after the step (b) of fabricating a molded body of the modified epoxysiloxanes.

16. A method of manufacturing modified epoxysiloxanes comprising the steps of:
   a) implementation of a condensation of an epoxyalkoxysilane of the general structure 1 with a silanol of the general structure 2

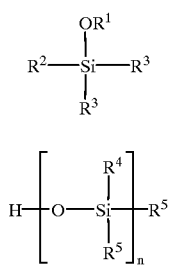

to produce an alkoxy-group-containing epoxysiloxane condensate, whereby
   $R^1$ is selected from the group consisting of an alkyl with 1 to 22 C atoms and an aryl,
   $R^2$ is selected from the group consisting of glycidyloxyalkyl, epoxyalkyl and an epoxycycloalkyl,
   $R^3$ is selected from the group consisting of $OR^1$, $R^2$, an alkyl and an aryl,
   $R^4$ is selected from the group consisting of alkyl and aryl, $R^5$ is selected from the group consisting of OH and $R^4$, and
   n is a whole number greater than 1; and
   b) carrying out a condensation of the alkoxy-group-containing epoxysiloxane condensate produced in step (a) in situ with an organic compound having a carbon structure of 1 to 24 C atoms and at least one condensable functional group wherein the organic compound used in step (b) is a structure selected from the group consisting of a linear carbon chain, a branched carbon chain, a cyclical structure and an aromatic structure.

17. The method of claim 16 wherein the organic compound used in step b) further comprises a plurality of reactive groups.

18. The method of claim 16 wherein the at least one condensable functional group is selected from the group consisting of hydroxy, epoxy, ester, lactone, lactam, halogen, pseudo halide, unsaturated C—C bonds, spiro groups, bicycloorthoester groups and spirocarbonate groups.

19. The method of claim 16 wherein the condensations of steps (a) and (b) are carried out as a batch reactions.

20. The method of claim 16 wherein the condensations of steps (a) and (b) are carried out at a temperature ranging from about 80° C. to about 150° C.

21. The method of claim 16 wherein the condensation of step (a) is carried out with a stoichiometric deficiency of silanol 2.

22. The method of claim 16 wherein steps (a) and (b) are carried out under an the inert gas stream.

23. The method of claim 16 wherein the cumulative reaction time of steps (a) and (b) ranges from about 2 hours to about 24 hours.

24. The method of claim 16 wherein the cumulative reaction time of steps (a) and (b) ranges from about 6 hours to about 8 hours.

25. The method of claim 16 further comprising the step of (c) subjecting the reaction product of step (b) to a thermal treatment in a vacuum.

26. The method of claim 16 further comprising the following step after step (a) and before step (b):
   mixing alkoxy-group-containing epoxysiloxane condensate produced in step (a) with an epoxy resin.

27. The method of claim 16 further comprising the following step after step(b):
   mixing condensate produced in step (b) with an epoxy resin.

28. The method of claim 26 further comprising the following step after step (b) of fabricating a molded body of the modified epoxysiloxanes.

29. The method of claim 27 further comprising the step after step (b) of fabricating a molded material of the modified epoxysiloxanes.

* * * * *